(12) United States Patent
Manaka et al.

(10) Patent No.: US 7,163,365 B2
(45) Date of Patent: Jan. 16, 2007

(54) PIVOT SHAFT STRUCTURE FOR SUPPORTING SWING ARM

(75) Inventors: Akio Manaka, Saitama (JP); Kanji Hayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 10/856,794

(22) Filed: Jun. 1, 2004

(65) Prior Publication Data
US 2004/0254023 A1 Dec. 16, 2004

(30) Foreign Application Priority Data
Jun. 12, 2003 (JP) ............... 2003-168411

(51) Int. Cl.
*A47G 3/00* (2006.01)
(52) U.S. Cl. .................. 411/374; 180/227
(58) Field of Classification Search ............ 411/120, 411/160, 372.5, 372.6, 373, 374; 16/381, 16/386; 180/226, 227, 384
See application file for complete search history.

(56) References Cited
U.S. PATENT DOCUMENTS 116,990 A * 7/1871 Plunkett ............... 411/374
4,484,650 A * 11/1984 Isaka et al. ............ 180/227 X
6,053,681 A * 4/2000 Mattershead ............ 411/374 X
6,224,167 B1 * 5/2001 Riley ..................... 411/120 X

FOREIGN PATENT DOCUMENTS
JP    2564078 B2    9/1996

* cited by examiner

*Primary Examiner*—Greg Binda
(74) *Attorney, Agent, or Firm*—Birch, Stewart, Kolasch & Birch, LLP

(57) ABSTRACT

A pivot shaft includes a shaft member having a male screw portion to be thread-connected to a vehicle body frame, and a nut member having a female screw portion to be thread-connected to part of a male screw portion of the shaft member corresponding to a projecting thread portion projecting from the vehicle body frame. The nut member as a locknut is attached so as to prevent the rotation of the adjusted shaft member. The locknut is a nut member formed into a cap-shape or a ball-head locknut shape. A tool engaging portion to which a multi-purpose tightening tool can be engaged is formed on the nut member. Since the multi-purpose tool can be engaged with the tool engaging portion on the nut member accurately, control of a tightening torque is facilitated, and the number of steps for controlling the tightening torque can be reduced.

13 Claims, 11 Drawing Sheets

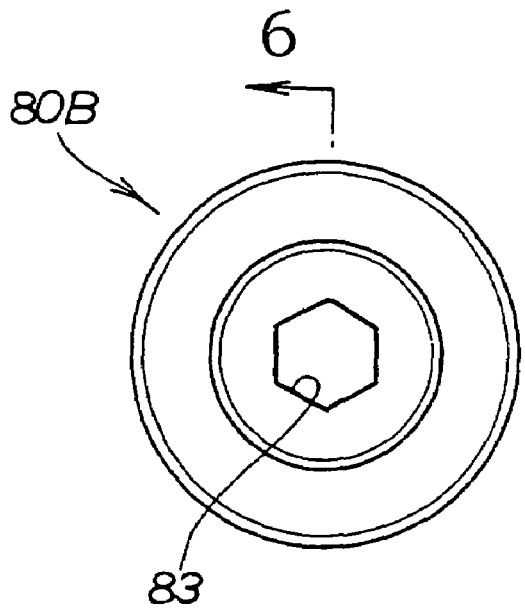
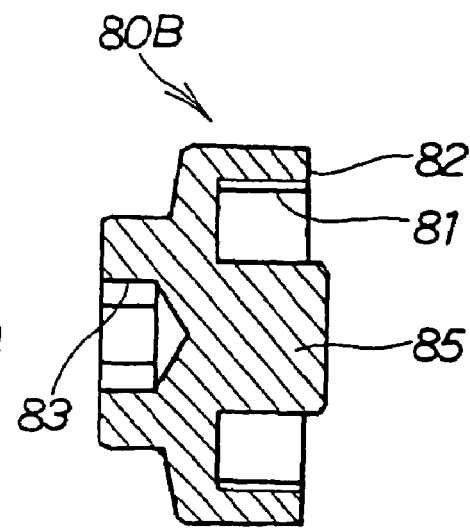
FIG. 6(a)   FIG. 6(b)
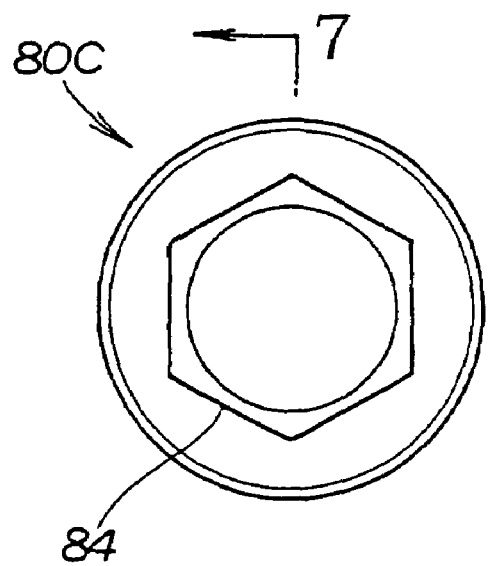
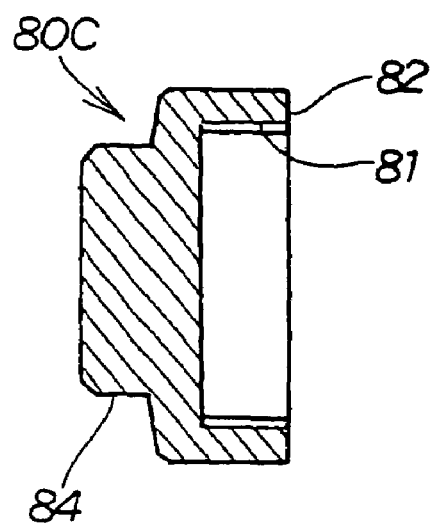
FIG. 7(a)   FIG. 7(b)

PIVOT SHAFT STRUCTURE FOR SUPPORTING SWING ARM

CROSS-REFERENCE TO RELATED APPLICATIONS

The present application claims priority under 35 USC 119 to Japanese Patent Application No. 2003-168411 filed on Jun. 12, 2003 the entire contents thereof is hereby incorporated by reference.

BACKGROUND OF THE INVENTION

1. Field of the Invention

The present invention relates to an improved technology for a pivot shaft structure used for making a vehicle body frame support for a swing arm.

2. Description of Background Art

In a motorcycle, a rear wheel is attached to a vehicle body frame via a swing arm for mounting the rear wheel to the vehicle body frame so as to be capable of swinging in the vertical direction. A pivot shaft is an element used for connecting the swing arm to the vehicle body frame.

In the related art, it is known that a locknut is used for a pivot shaft of a motorcycle. See, for example, JP Patent No.2564078 (FIG. 1).

FIG. 16 is a drawing that is disclosed in JP Patent No.2564078. However, the reference numerals are renumbered.

A pivot shaft structure is configured by mounting a boss 104 as an outer cylinder to, and integrating with, a sleeve 101 as an internal cylinder via needle bearings 102, 102 and a ball bearing 103. The structure is placed between left and right frames 105, 106. A pivot shaft 107 is set by screwing it through the left frame 105 into the left frame 105 through the sleeve 101 and into the frame 106. A nut 108 is secured onto the pivot shaft 107 at the right end in the drawing. A locknut 110 is screwed onto the pivot shaft 107 at the left end in the drawing.

This structure exhibits an effect of preventing the idling of the running of the pivot shaft 107 with respect to the frame 105 by screwing the locknut 110 onto the pivot shaft 107.

The locknut 110 is a nut having four notches 111 ... ( ... represents a plurality of elements, hereinafter) on the outer periphery thereof. Although its shape is rather specific, it is a component which is often employed.

However, in order to fasten the locknut 110, it is necessary to provide a specific tool 114 having four claws 113 ... at the extremity of a cylindrical portion 112, and engage the claws 113 ... with the notches 111 .... The specific tool 114 having the plurality of claws 113 ... has a significant cost.

In addition, since it is required to use the specific tool for the locknut 110 in the related art, torque control is difficult, and hence a number of steps are required for torque control.

SUMMARY AND OBJECTS OF THE INVENTION

In order to solve the problems described above, the present invention provides a pivot shaft used for mounting a swing arm to a vehicle body frame so as to be capable of a swinging motion. A shaft member is provided that is thread-connected to the vehicle body frame with a nut member having a cap-shape or a ball-head locknut shape as a whole including a tool engaging portion having a female screw portion to be thread-connected to part of a male screw portion of the shaft member corresponding to a projecting thread portion projecting from the vehicle body frame, and an abutting surface to be abutted against the vehicle body frame so that a multi-purpose tool can engage therewith.

In other words, the locknut is a nut member formed into a cap-shape or a ball-head locknut shape, and the tool engaging portion with which the multi-purpose tightening tool can be engaged is formed on the nut member.

Therefore, since the nut member can be turned by the multi-purpose tool, it is not necessary to provide a specific tool. In addition, since the multi-purpose tool can be engaged with the tool engaging portion on the nut member accurately, control of tightening torque is facilitated, and the number of steps for controlling the tightening torque can be reduced.

In addition, the present invention includes a pivot shaft used for mounting a swing arm to a vehicle body frame so as to be capable of a swinging motion having a shaft member to be thread-connected to the vehicle body frame with a holding member having a cap-shape as a whole and having an abutting surface to be abutted against the vehicle body frame. A bolt is provided that has the function to combine the holding member with the shaft member and bring the abutting surface into abutment against the vehicle body frame.

In other words, the locknut is replaced by the cap-shaped holding member and the bolt. Therefore, a pulling force is added to the shaft member in the axial direction by the holding member and the bolt so that a combining force of the pivot shaft with respect to the vehicle body frame can be improved.

Since the bolt can be rotated by a multi-purpose tool, it is not necessary to provide a specific tool. In addition, since the multi-purpose tool can be engaged with a bolt head accurately, control of the tightening torque is facilitated and the number of steps for controlling the tightening torque can be reduced.

The present invention provides a bolt that is formed integrally with the holding member. By forming the bolt integrally with the holding member, the number of components can be reduced. Thus, the components are prevented from being lost, which facilitates the management of the components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(a) and 6(b) show another embodiment of the nut member according to the present invention;

FIGS. 7(a) and 7(b) show still another embodiment of the nut member according to the present invention;

DETAILED DESCRIPTION OF THE PREFERRED EMBODIMENTS

Figure 1:
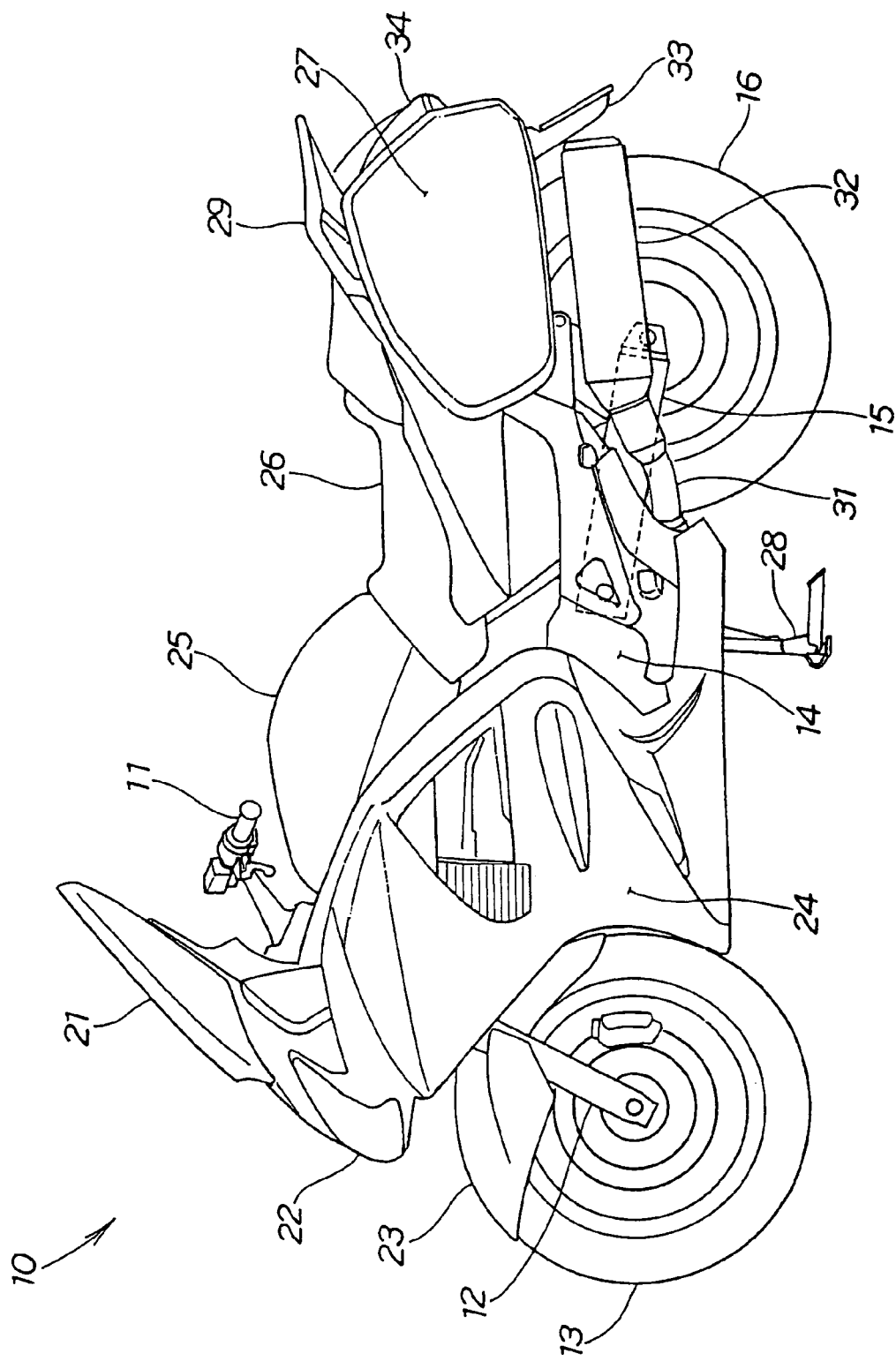
FIG. 1 is a side view of a motorcycle employing a swing arm structure according to the present invention.

Referring now to the drawings, embodiments of the present invention will be described.

FIG. 1 is a side view of a motorcycle employing a swing arm structure according to the present invention, in which a motorcycle 10 is a vehicle having a handle 11, a front fork 12 and a front wheel 13 to be steered by the handle 11 disposed on the front portion of the vehicle body. A vehicle body frame 14 is disposed from the front of the vehicle body to the center portion of the vehicle body with an engine (not shown) mounted to the vehicle body frame 14. A swing arm 15 is attached to the lower portion of the vehicle body frame 14 so as to be capable of a swinging motion with a rear wheel 16 attached to the rear end of the swing arm 15.

The motorcycle 10 includes a wind screen 21 that is provided together with a head lamp 22, a front fender 23, a cowling 24, a fuel tank 25, a seat 26, a luggage box 27, a stand 28, a grab rail 29, an exhaust pipe 31, a muffler 32, a rear fender 33, and a tail lamp 34.

Figure 2:
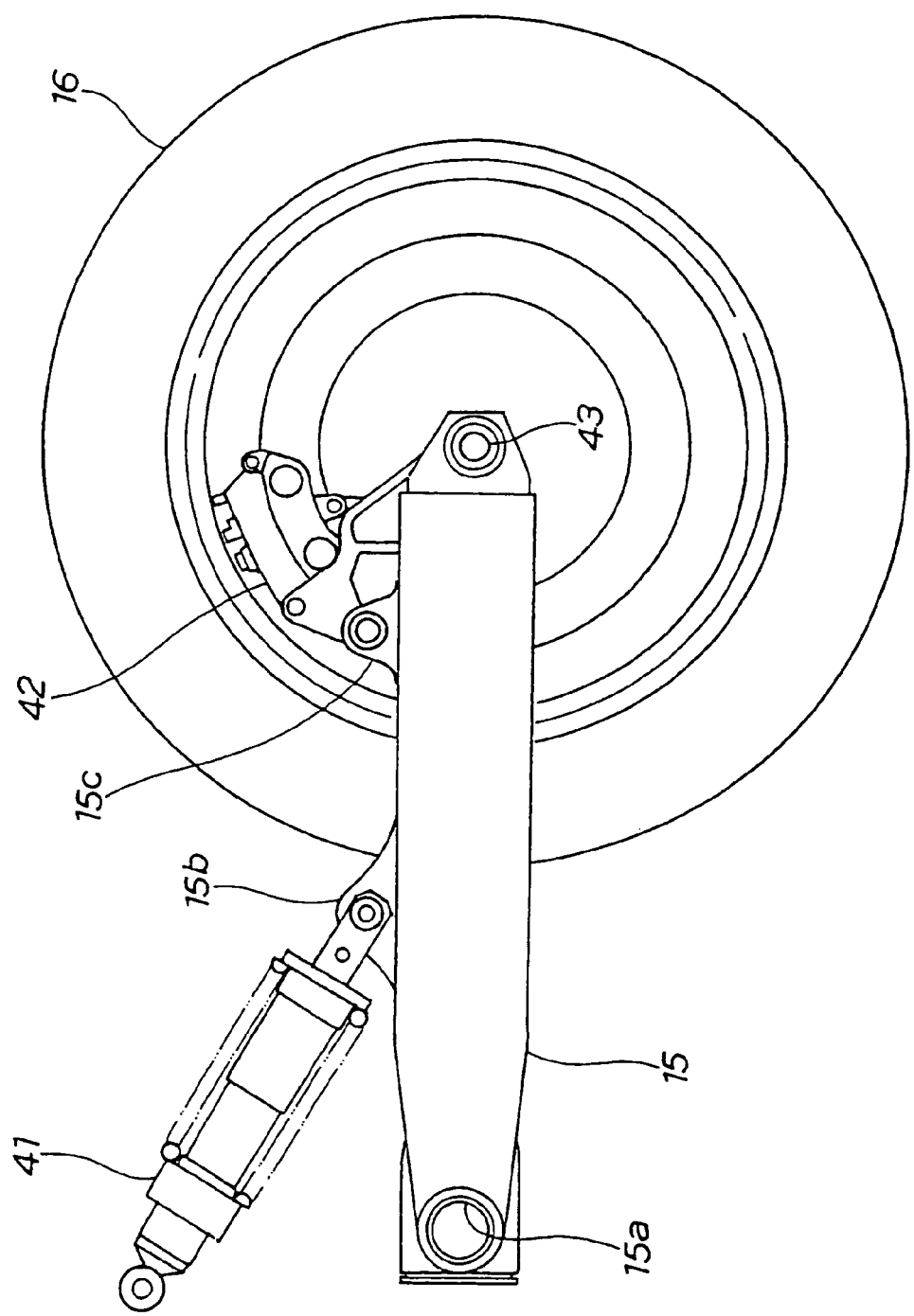
FIG. 2 is an explanatory side view of the swing arm structure according to the present invention.

FIG. 2 is an explanatory side view of the swing arm structure according to the present invention, in which the swing arm 15 is a casting product formed of an aluminum alloy including bearing holes 15a, 15a (the bearing hole 15a on the far side is not shown) for inserting a swing shaft (described later) provided on the vehicle body side. A shock absorber mounting portion 15b is provided to which the one end of a rear shock absorber 41 is attached. The other end of the rear shock absorber 41 is attached to the vehicle body frame 14 (see FIG. 1). A caliper mounting portion 15c is provided for mounting a caliper 42 of a rear disk brake. An axle 43 of the rear wheel 16 is attached to the swing arm 15.

Figure 3:
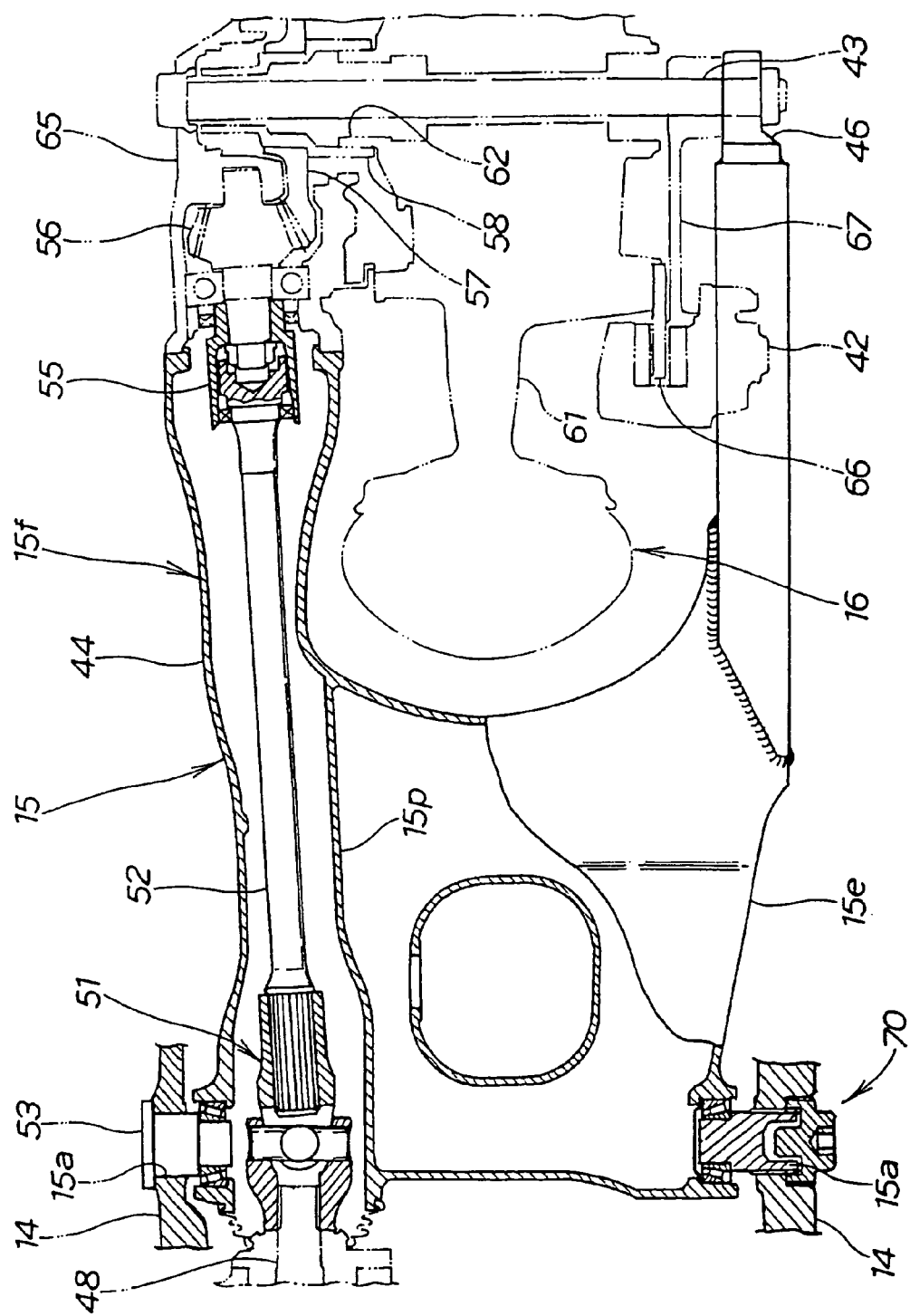
FIG. 3 is an explanatory cross-sectional view of the swing arm including a pivot shaft according to the present invention.

FIG. 3 is an explanatory cross-sectional view of a swing arm including a pivot shaft according to the present invention, in which a swing arm body 44 is a member configured by providing a diaphragm 15p for isolating an arm half 15e and a shaft storing section 15f, storing a universal joint 51 mounted to an output shaft 48 of the engine. A drive shaft 52 is connected to the universal joint 51 in the shaft storing section 15f, and fitting bearing holes 15a, 15a to a right pivot shaft 53 and a left pivot shaft 70 are mounted to the vehicle body frame 14.

In FIG. 3, a structure is configured to transmit an engine output from an output shaft 48 of the engine to the rear wheel 16 by connecting a drive-side bevel gear 56 to the rear end of the drive shaft 52 via a joint member 55. A driven-side bevel gear 57 is engaged with the drive-side bevel gear 56. An intermediate gear 58 is engaged with the driven-side bevel gear 57 and a wheel side gear 62 is provided on a wheel 61 that is engaged with the intermediate gear 58. A shaft rear supporting portion 65 is mounted at the rear end of the shaft storing section 15f for supporting the axle 43 together with an axle mounting portion 46 as well as the aforementioned drive-side bevel gear 56 and the driven-side bevel gear 57. A disk 66 is provided for a disk brake together with a caliper supporting portion 67 for supporting the caliper 42.

Figure 4:
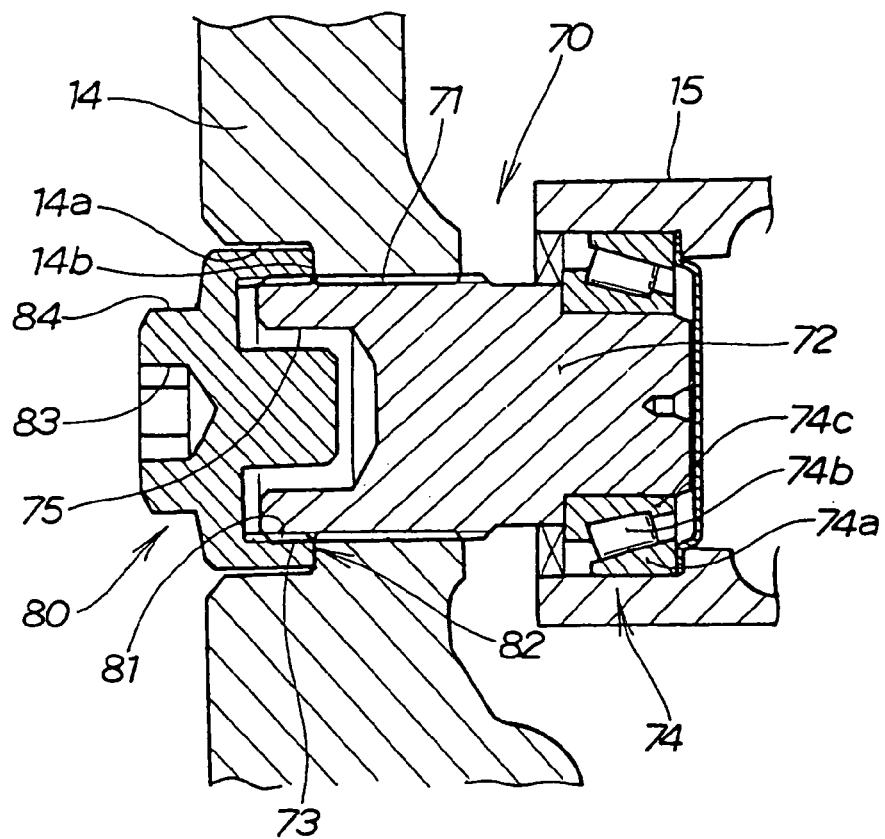
FIG. 4 is an enlarged cross-sectional view having a pivot shaft structure according to the present invention.

FIG. 4 is an enlarged cross-sectional view having a pivot shaft structure according to the present invention, in which a left pivot shaft 70 includes a shaft member 72 having a male screw portion 71 to be thread-connected to the vehicle body frame 14 with a nut member 80 having a female screw portion 81 to be thread-connected to a projecting screw portion 73 of the male screw portion 71 of the shaft member 72 projecting (exposed) from the vehicle body frame 14.

The shaft member 72 supports the swing arm 15 via a conical roller bearing 74. The conical roller bearing 74 includes an outer wheel 74a, balls 74b . . . , and an inner wheel 74c with the fitting state getting stronger when moving the inner wheel 74c to the right in the drawing with respect to the outer wheel 74a, and the fitting state getting loosened when it is moved leftward in the drawing.

Since such a fitting state is set up for each vehicle type, it is adjusted to a predetermined fitting state by fitting the tool into the hexagonal hole 75 formed at the left end of the shaft member 72 in the drawing and rotating the shaft member 72 by a tool in the assembly process.

A nut member 80 as a locknut is attached so as to prevent the adjusted shaft member 72 from rotating. A preferred structure of the nut member 80 will be described in conjunction with the FIG. 5.

Figure 5:
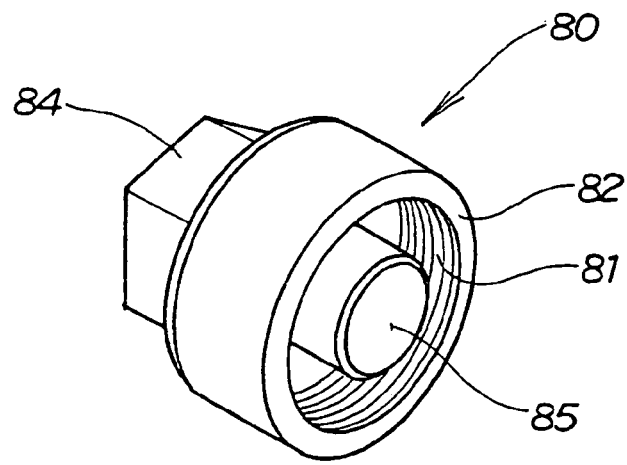
FIG. 5 is a perspective view of a nut member according to the present invention.

FIG. 5 is a perspective view of a nut member according to the present invention, in which the nut member 80 has a ball-head locknut shape or a cap-shape as a whole, and includes a female screw portion 81 which can be screwed onto the male screw portion 71 (see FIG. 4) of the shaft member 72. A ring-shaped abutting surface 82 is formed on the front surface with a hexagonal hole 83 (see FIG. 4) and a hexagonal head 84 formed on the rear portion thereof. The multi-purpose tool can engage the hexagonal head 84. A projection 85 is formed at the center of the nut member 80.

Returning to FIG. 4, a back facing portion 14a is provided on the vehicle body frame 14. The provision of the back facing portion 14a allows part of the male screw portion 71 of the shaft member 72 to project or be exposed relative to the body frame 14. Therefore, the nut member 80 is screwed onto the projecting screw portion 73, the nut member 80 is tightened by the multi-purpose tool, and the abutting surface 82 abuts against a bottom surface 14b of the back facing portion 14a by a predetermined force at the completion of the tightening. Upon tightening, the shaft member 72 is pulled towards the left in FIG. 4 with respect to the vehicle body frame 14 and a friction force generated at the thread-connection increases. Consequently, the shaft member 72 is prevented from rotating.

As described above, the locknut is formed into the nut member 80 of a cap-shape or a ball-head locknut shape. The tool engaging portions (the hexagonal hole 83 or the hexagonal head 84), for engagement with the multi-purpose tightening tool, are formed on the nut member 80.

Since the nut member 80 can be rotated with the multi-purpose tool, it is not necessary to provide a specific tool. In addition, since the multi-purpose tool can be engaged with tool engaging portions 83, 84 on the nut member 80 accurately, the control of the tightening torque is facilitated, and the number of steps for controlling the tightening torque can be reduced.

FIGS. 6(*a*) and 6(*b*) show another embodiment of the nut member according to the present invention, in which FIG. 6(*b*) is a cross-sectional view taken along the line 6 in FIG. 6(*a*).

A nut member 80B has a ball-head locknut shape or a cap-shape as a whole with the female screw portion 81 which can be screwed onto the male screw portion 71 (see FIG. 4) of the shaft member 72. A ring-shaped abutting surface 82 is formed on the front surface. The hexagonal hole 83 to which the multi-purpose tool (a hexagonal wrench or the like) can be engaged is formed at the rear portion. A projection 85 is formed at the center of the nut member 80B.

FIGS. 7(*a*) and 7(*b*) show still another embodiment of the nut member according to the present invention, in which FIG. 7(*b*) is a cross-sectional view taken along the line 7 in FIG. 7(*a*).

A nut member 80C has a ball-head locknut shape or a cap-shape as a whole with the female screw portion 81. The ring-shaped abutting surface 82 is formed on the front surface thereof. The hexagonal head 84 to which the multi-purpose tool (such as a box wrench or the like) can be engaged is formed on the rear portion thereof.

As shown in FIGS. 6(*a*) and 6(*b*) and FIG. 7(*a*) and 7(*b*), the nut members 80B, 80C may simply be provided with at least one of the hexagonal hole 83 and the hexagonal head 84 to which the multi-purpose tool can be engaged on the rear portion thereof. The projection 85 at the center shown in FIGS. 6(*b*) can be omitted as shown in FIG. 7(*b*).

Figure 8:
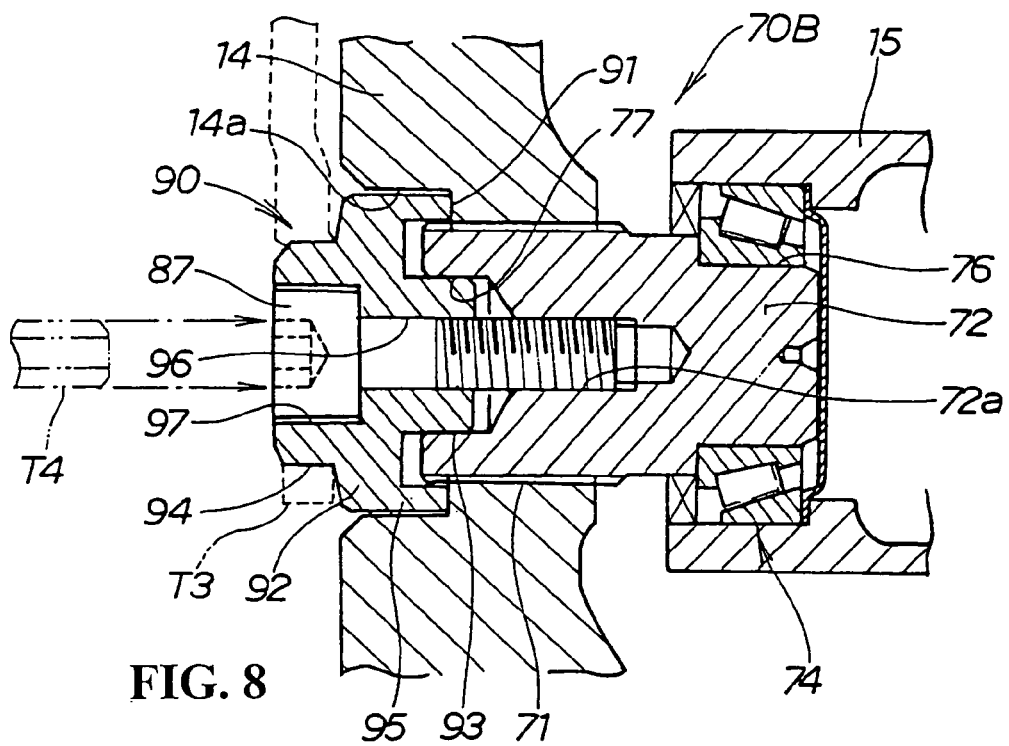
FIG. 8 is an embodiment modified from the structure shown in FIG. 4.

FIG. 8 is an embodiment modified from the structure shown in FIG. 4, in which a pivot shaft 70B includes the shaft member 72 having the male screw portion 71 to be thread-connected to the vehicle body frame 14. A holding member 90 includes a cap-shape as a whole and has an abutting surface 91 to be abutted against the vehicle body frame 14. A bolt 87 has a function of combining the holding member 90 with the shaft member 72 and bring the abutting surface 91 into abutment against the vehicle frame 14. The configurations of the respective components are shown in conjunction with FIG. 9 in detail.

Figure 9:
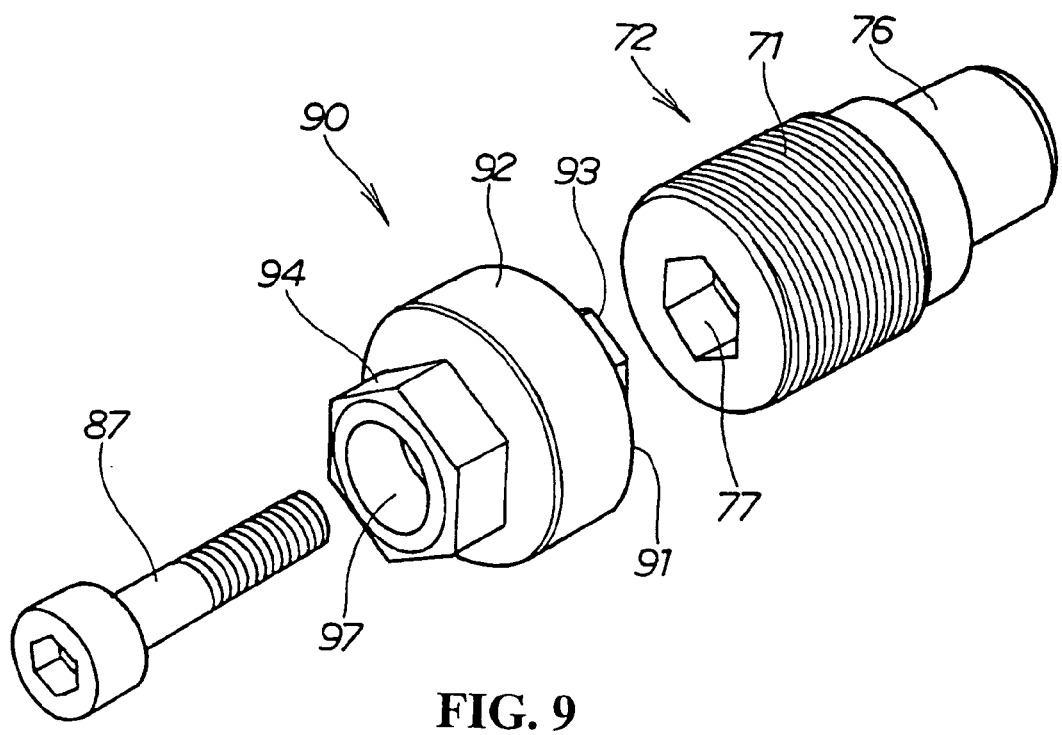
FIG. 9 is an exploded perspective view of the pivot shaft shown in FIG. 8.

FIG. 9 is an exploded perspective view of a pivot shaft shown in FIG. 8. The shaft member 72 includes the male screw portion 71 on the outer periphery of the column body with a small diameter portion 76 to be fitted into the conical roller bearing formed at one end, and a first hexagonal bole 77 formed at the other end.

The holding member 90 includes a first hexagonal head 93 at one end of a cap-shaped body 92, and a second hexagonal head 94 at the other end thereof. The first hexagonal head 93 engages a first hexagonal hole 77 on the side of the shaft member 72 and serves to prevent the shaft member 72 from rotating by itself.

Furthermore, as shown in FIG. 8, the holding member 90 is not formed with a screw portion on a skirt portion 95 extending from the body portion 92. Therefore, the skirt portion 95 does not engage with the male screw portion 71 of the shaft member 72. In addition, the holding member 90 includes a bolt hole 96 and a recess 97 in which a bole head is stored.

A bolt with a hexagonal hole can be employed as the bolt 87.

Returning to FIG. 8, the holding member 90 is set by screwing the shaft member 72 into the vehicle body frame 14, fitting the first hexagonal head 93 into the first hexagonal hole 77 after adjustment of the shaft member 72 is completed, and inserting the skirt portion 95 into the back facing portion 14*a*. Then, the bolt 87 is screwed into a female screw portion 72*a* of the shaft member. At this time, when the bolt 87 is tightened by a hexagonal wrench T4 while engaging a screw wrench T3 with the second hexagonal head 94, not only the rotation of the holding member 90, but also the rotation of the shaft member 72 can preferably be prevented since the first hexagonal head 93 engages with the first hexagonal hole 77.

Since the abutting surface 91 of the holding member 90 abuts against the vehicle body frame 14, when the bolt 87 is tightened, the shaft member 72 is pulled to the left in FIG. 8. As a consequence, a frictional force between the shaft member 72 and the vehicle body frame 14 increases, and hence the combining force of the shaft member 72 with respect to the vehicle body frame 14 is increased.

In addition, when the shaft member 72 is being pulled, the bolt 87 is also extended. The bolt 87 tends to restore in the resilient area. In other words, it exhibits a spring effect. As a consequence, even when the holding member 90 and the like are subjected to vibrations in association with traveling of the vehicle, the probability of rotation of the holding member 90 may be avoided.

In the example shown in FIG. 8, the locknut is replaced by the cap-shaped holding member 90 and the bolt 87. In other words, a pulling force in the axial direction is added to the shaft member 72 by the holding member 90 and the bolt 87 so as to increase the combining force of the pivot shaft (shaft member 72) with respect to the vehicle body frame 14.

Since the bolt 87 can be rotated by the multi-purpose tool, it is not necessary to provide the specific tool. In addition, since the multi-purpose tool can be engaged with the head of the bolt 87 accurately, control of the tightening torque is facilitated and the number of steps for controlling the tightening torque can be reduced.

By employing the structure shown in FIG. 8, particular effects described below may be achieved.

Figure 10A:
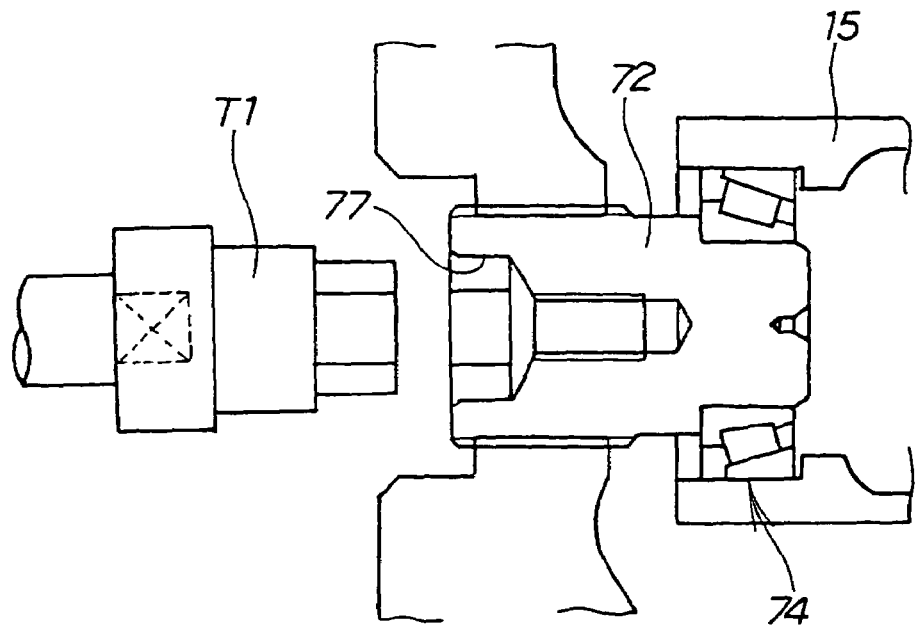
FIGS. 10(a) and 10(b) are explanatory drawing showing the operation of the pivot shaft structure according to the present invention.
Figure 10B:
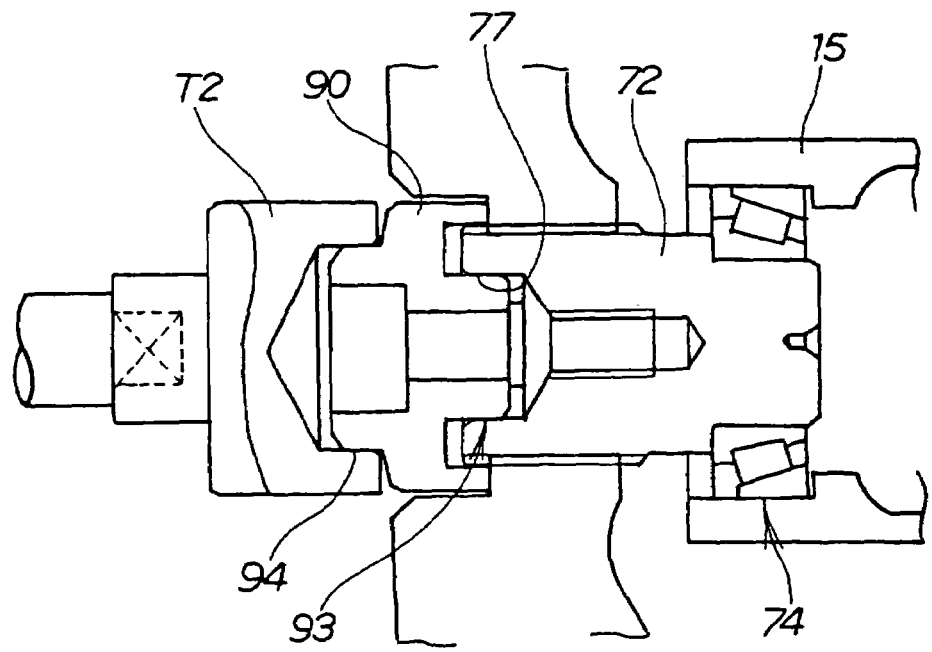

FIGS. 10(*a*) and (*b*) are explanatory drawings of the operation the pivot shaft structure according to the present invention.

The fitting state of the conical roller bearing 74 can be adjusted by rotating the shaft member 72. In FIG. 10(*a*), adjustment can be carried out by fitting a rotating tool T1 into the first hexagonal hole 77, and directly rotating the shaft member 72 by the rotating tool T1.

In FIG. 10(*b*), adjustment can be carried out by fitting a rotating tool T2 into the second hexagonal head 94 of the holding member 90 and rotating the shaft member 72 by the same rotating tool T2 via the holding member 90. This is possible because the first hexagonal head 93 is fitted into the first hexagonal hole 77.

In either cases of FIGS. 10(*a*) or 10(*b*), fitting adjustment of the conical roller bearing 74 is possible and hence the flexibility of the adjusting operation or assembling operation increases.

Figure 11:
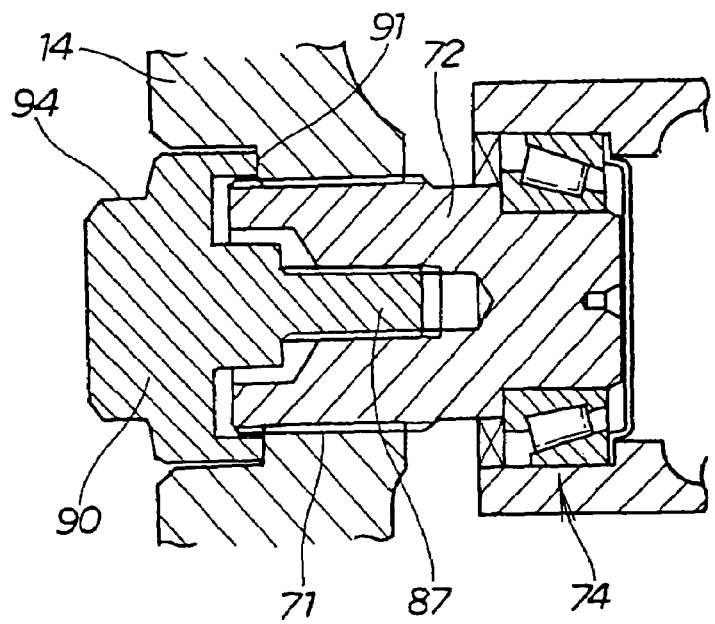
FIG. 11 shows another embodiment compared to FIG. 8 (Part 1)

FIG. 11 is a modification of the embodiment shown in FIG. 8 (Part 1), and reference numerals which are common to those in FIG. 8 are cited therefrom and detailed descriptions are omitted.

In other words, it is characterized in FIG. 11 that the bolt 87 is integrated with the holding member 90. By rotating the hexagonal head 94, the bolt 87 can be screwed into the shaft member 72.

By integrally forming the bolt 87 with the holding member 90, the number of components can be reduced, and the components are prevented from being lost, as well as facilitating the management of the components.

Figure 12:
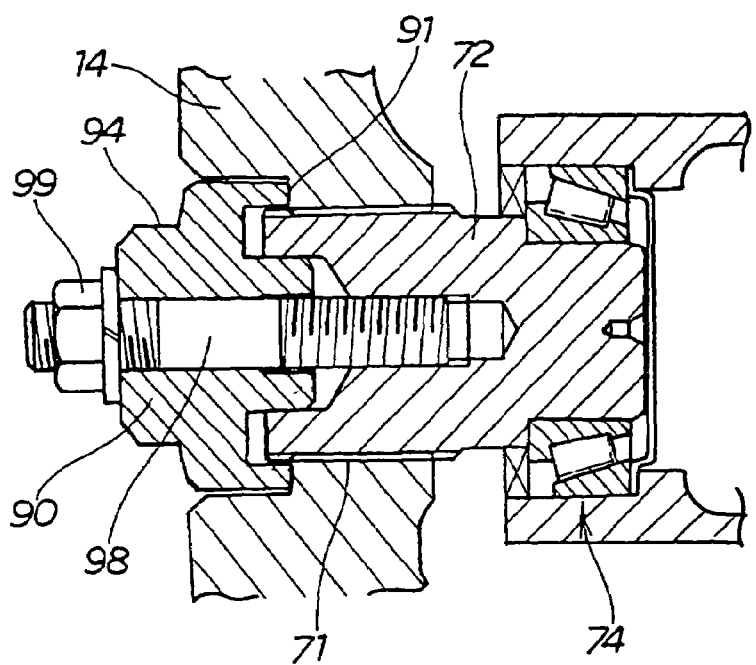
FIG. 12 shows another embodiment compared to FIG. 8 (Part 2)

FIG. 12 is another modification of the embodiment shown in FIG. 8 (Part 2), and reference numerals of the elements which are common to those in FIG. 8 are cited therefrom and a detailed description is omitted.

In other words, a stud bolt 98 having threaded portions at both ends of a rod is employed, and one end of the stud bolt 98 is screwed into the shaft member 72 and a nut 99 is screwed into the other end. By screwing the nut 99, the shaft member 72 can be pulled. The stud bolt 98 and the nut 99 are very easily available for tightening.

Figure 13:
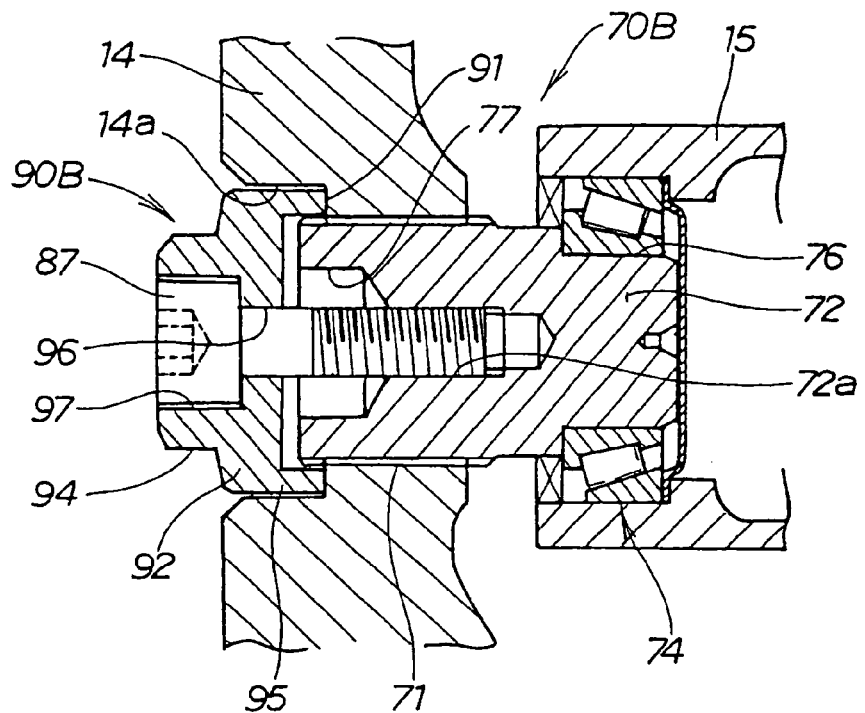
FIG. 13 shows another embodiment compared to FIG. 8 (Part 3)

FIG. 13 is still another modification of the embodiment shown in FIG. 8 (Part 3), and reference numerals of the elements which are common to those in FIG. 8 are cited therefrom and a detailed description is omitted.

In other words, a holding member 90B is a cap-shaped member having the first hexagonal head (see reference numeral 93 in FIG. 8) omitted. Since the first hexagonal head is omitted, the weight of the holding member 90B is reduced, and hence the cost of reduction of the component is achieved.

Figure 14:
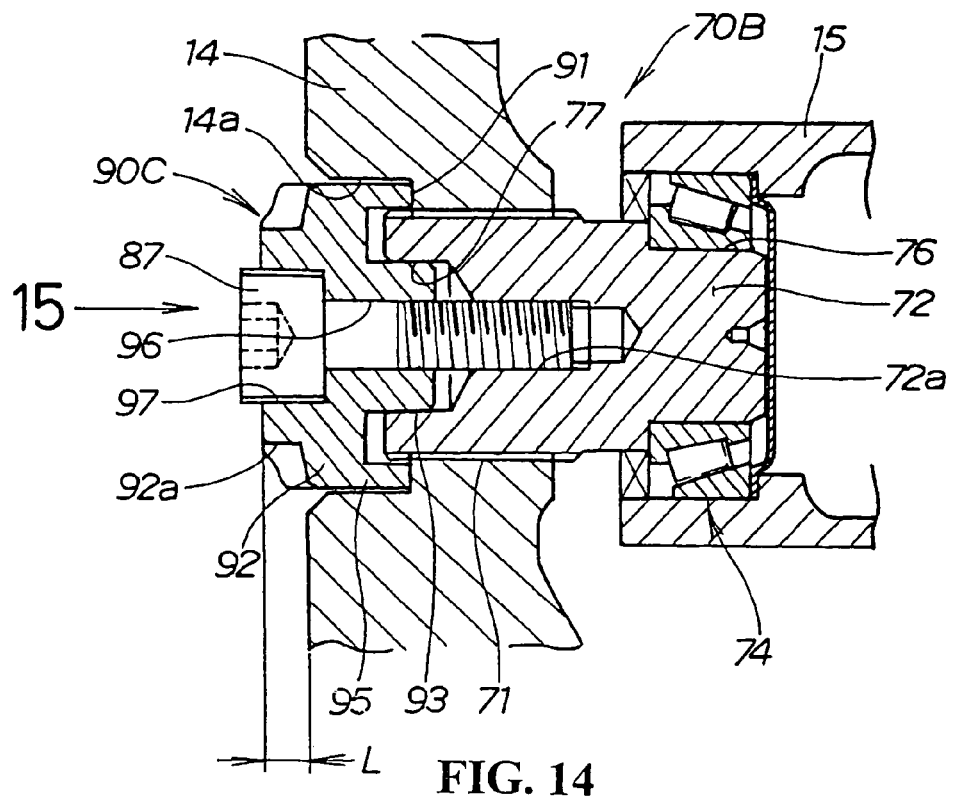
FIG. 14 shows another embodiment compared to FIG. 8 (Part 4)

FIG. 14 is a further modification of the embodiment shown in FIG. 8 (Part 4), and reference numerals of the elements which are common to those in FIG. 8 are cited therefrom and a detailed description is omitted.

A holding member 90C is characterized by a plurality of tool engaging recesses 92a . . . on the body portion 92 thereof.

Figure 15:
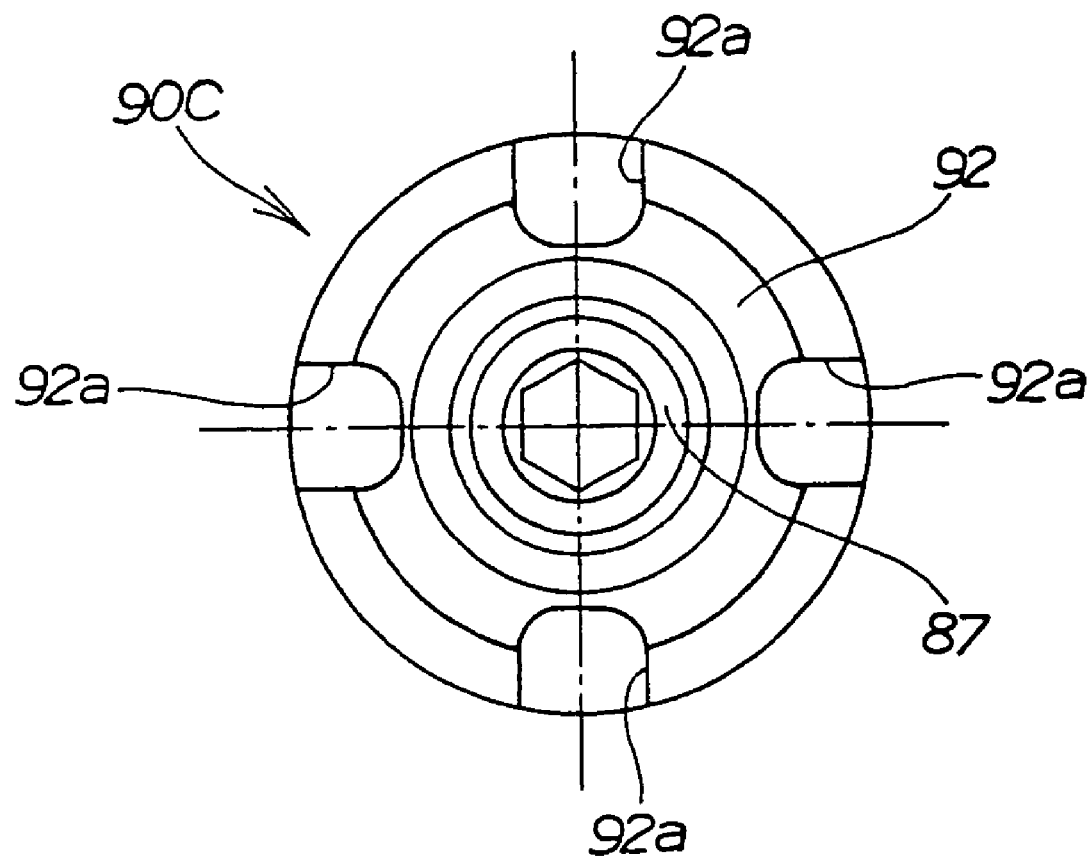
FIG. 15 is a drawing viewing FIG. 14 in the direction indicated by an arrow 15.
Figure 16:
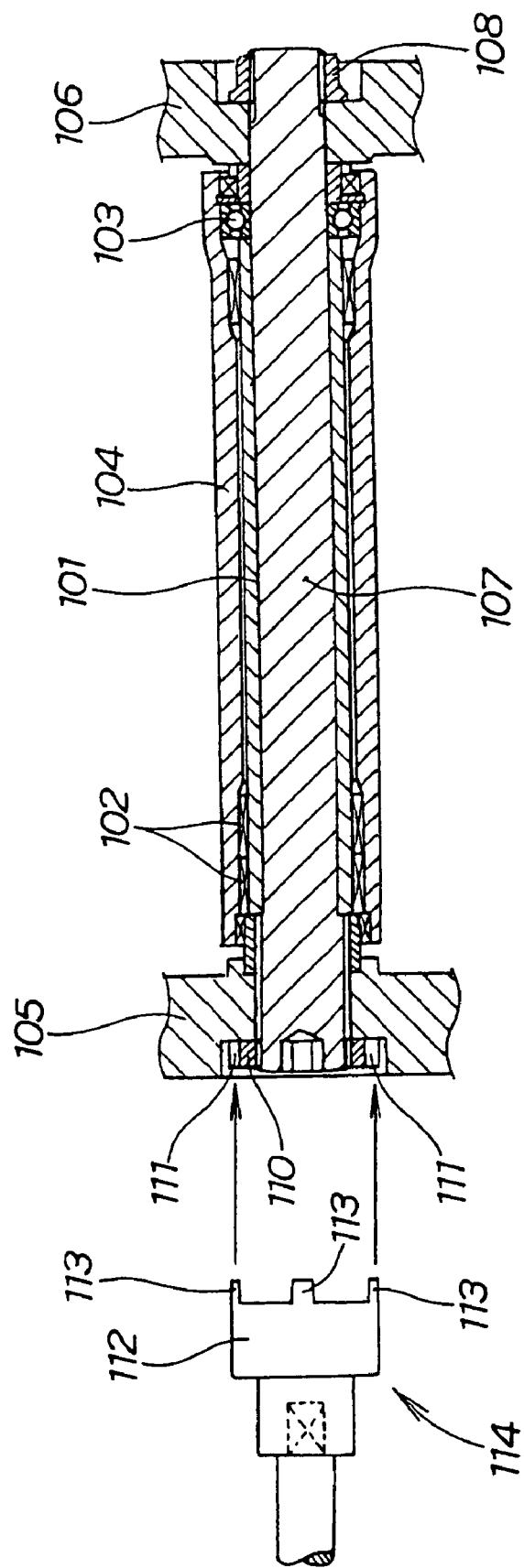
FIG. 16 is a drawing cited from JP Patent No. 2564078.

FIG. 15 is a drawing viewing FIG. 14 in the direction indicated by an arrow 15, in which the holding member 90C is provided with four tool engaging recesses 92a . . . disposed at pitches of 90 degrees. The number of the tool engaging recesses 92a is arbitrary as long as there are two or more of the tool engaging recesses 92a.

Referring now to FIG. 14, the holding member 90C is set while fitting the first hexagonal head 93 into the first hexagonal hole 77 of the adjusted shaft member 72, and the detent tool (not shown) is set to the tool engaging recesses 92a . . . of the holding member 90C, and the bolt 87 is screwed into the female screw portion 72a of the shaft member. By engaging the detent tool with the tool engaging recess 92a . . . , not only the rotation of the holding member 90C, but also the rotation of the shaft member 72 can be prevented, because the first hexagonal head 93 engages with the first hexagonal hole 77.

In addition, when the holding member 90C is employed, a projecting margin L of the holding member 90C projecting from the outer surface of the vehicle body frame 14 can be reduced. Thus, the depth of the tool engaging recess 92a can be reduced. In other words, since the tool engaging recess 92a simply locks the rotation of the holding member 90C, a large torque is not exerted thereto, and hence the depth thereof can be reduced.

The tightening torque generated by the tool (hexagonal wrench) is exerted to the bolt 87. Therefore, since the multi-purpose tool (hexagonal wrench) can be engaged with the bolt accurately, control of tightening torque is facilitated, and the number of steps for controlling the tightening torque can be reduced.

The shape of the tool engaging portion is arbitrary and may have a square hole and a square head, or an octagonal hole and an octagonal head, in addition to the hexagonal hole and the hexagonal head which is explained in the embodiments.

With the arrangement described above, the present invention provides the following advantages.

According to present invention, the locknut is a nut member formed into a cap-shape or a ball-head locknut shape, and a tool engaging portion with which the multi-purpose tightening tool can be engaged is formed on the nut member. Since the nut member can be turned by the multi-purpose tool, it is not necessary to provide a specific tool. In addition, since the multi-purpose tool can be engaged with the tool engaging portion on the nut member accurately, control of the tightening torque is facilitated, and the number of steps for controlling the tightening torque can be reduced.

In present invention, the locknut is replaced by the cap-shaped holding member and the bolt. Therefore, a pulling force is added to the shaft member in the axial direction by the holding member and the bolt so that a combining force of the pivot shaft with respect to the vehicle body frame can be improved.

Since the volt can be rotated by the multi-purpose tool, it is not necessary to provide a specific tool. In addition, since the multi-purpose tool can be engaged with the bolt head accurately, control of tightening torque is facilitated, and the number of steps for controlling the tightening torque can be reduced.

The present invention may provide a bolt that is formed integrally with the holding member.

By forming the bolt integrally with the holding member, the number of components can be reduced. Thus, the components are prevented from being lost, which facilitates management of the components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pivot shaft structure for supporting a swing arm comprising:
   a shaft member adapted to be thread-connected to a vehicle body frame;
   a holding member having a cap shape, and having an abutting surface to be abutted against the vehicle body frame; and
   a bolt for combining the holding member with the shaft member and bringing the abutting surface against said vehicle body frame,
   wherein the holding member includes a plurality of tool engaging portions on an outer portion thereof.

2. The pivot shaft structure for supporting the swing arm according to claim 1, wherein the bolt is formed integrally with the holding member.

3. The pivot shaft structure for supporting the swing arm according to claim 1, wherein the holding member includes a skirt portion disposed adjacent to said shaft member for abutting against the vehicle body frame.

4. The pivot shaft structure for supporting the swing arm according to claim 1, wherein said plurality of tool engaging portions includes sides of a hexagonal head.

5. The pivot shaft structure for supporting the swing arm according to claim 1, wherein the vehicle body frame includes a back facing portion adjacent to an aperture for said shaft member to project therefrom, and
   wherein said abutting surface of said holding member abuts against a bottom surface of the back facing portion of said vehicle body frame.

6. The pivot shaft structure for supporting the swing arm according to claim 1, wherein said bolt includes an aperture formed in a head portion for permitting selective manual tightening of the bolt relative to the shaft member.

7. The pivot shaft structure for supporting the swing arm according to claim 1, wherein said plurality of tool engaging portions is a plurality of tool engaging recesses.

8. In a pivot shaft used when mounting a swing arm to a vehicle body frame so as to be capable of a swinging motion, a pivot shaft structure for supporting the swing arm comprising:
   a shaft member to be thread-connected to the vehicle body frame;
   a holding member having a cap-shape as a whole and having an abutting surface to be abutted against the vehicle body frame; and
   a bolt for combining the holding member with the shaft member and bringing the abutting surface into abutment against the vehicle body frame,
   wherein the abutting surface abuts against a bottom surface of a back facing portion of the vehicle body frame.

9. The pivot shaft structure for supporting the swing arm according to claim 8, wherein the bolt is formed integrally with the holding member.

10. The pivot shaft structure for supporting the swing arm according to claim 8, wherein the holding member includes a skirt portion disposed adjacent to said shaft member for abutting against the vehicle body frame.

11. The pivot shaft structure for supporting the swing arm according to claim 8, wherein the holding member includes a proximal hexagonal head portion for mating with a receiving hexagonal aperture formed in said shaft member.

12. The pivot shaft structure for supporting the swing arm according to claim 8, wherein said bolt includes an aperture formed in a head portion for permitting selective manual tightening of the bolt relative to the shaft member.

13. The pivot shaft structure for supporting the swing arm according to claim 8, wherein the holding member includes a plurality of tool engaging recesses on an outer portion thereof.

* * * * *